United States Patent [19]
Rudeen

[11] Patent Number: 6,134,039
[45] Date of Patent: Oct. 17, 2000

[54] WAVELENGTH DEPENDENT THERMALLY COMPENSATED OPTICAL SYSTEM

[75] Inventor: Robert W. Rudeen, Eugene, Oreg.

[73] Assignee: PSC Scanning, Inc., Eugene, Oreg.

[21] Appl. No.: 09/222,146

[22] Filed: Dec. 29, 1998

Related U.S. Application Data

[60] Provisional application No. 60/072,683, Jan. 27, 1998.

[51] Int. Cl.[7] ............................. G02B 26/08; G02B 27/44
[52] U.S. Cl. ......................... 359/196; 359/565; 359/900; 235/462.23
[58] Field of Search ..................... 359/196, 565, 359/569, 900; 235/462.23, 462.24

[56] References Cited

U.S. PATENT DOCUMENTS

| | | | |
|---|---|---|---|
| 4,560,862 | 12/1985 | Eastman et al. | 235/467 |
| 4,591,242 | 5/1986 | Broockman et al. | 235/457 |
| 4,721,860 | 1/1988 | Troendle | 250/568 |
| 4,748,316 | 5/1988 | Dickson | 235/454 |
| 4,808,804 | 2/1989 | Krichever et al. | 235/462 |
| 4,831,275 | 5/1989 | Drucker | 250/566 |
| 4,861,975 | 8/1989 | Kino et al. | 250/201 |
| 4,877,949 | 10/1989 | Danielson et al. | 235/462 |
| 5,080,456 | 1/1992 | Katz et al. | 359/214 |
| 5,134,511 | 7/1992 | Shiraishi et al. | 359/196 |
| 5,202,784 | 4/1993 | Reddersen | 359/196 |
| 5,216,550 | 6/1993 | Rudeen | 359/196 |
| 5,260,828 | 11/1993 | Londoño et al. | 359/565 |
| 5,296,724 | 3/1994 | Ogata et al. | 257/98 |
| 5,479,011 | 12/1995 | Rudeen et al. | 250/235 |
| 5,538,674 | 7/1996 | Nisper et al. | 264/1.31 |
| 5,563,868 | 10/1996 | Farnsworth et al. | 369/112 |
| 5,673,136 | 9/1997 | Inoue et al. | 359/205 |
| 5,691,847 | 11/1997 | Chen | 359/565 |
| 5,701,191 | 12/1997 | Iwasaki | 359/206 |
| 5,737,120 | 4/1998 | Arriola | 359/565 |
| 5,745,289 | 4/1998 | Hamblen | 359/565 |
| 5,808,799 | 9/1998 | Klocek | 359/619 |
| 5,825,741 | 10/1998 | Welch et al. | 369/112 |

FOREIGN PATENT DOCUMENTS

| | | |
|---|---|---|
| 0690328 A1 | 1/1996 | European Pat. Off. . |
| 401206682 | 8/1989 | Japan . |

OTHER PUBLICATIONS

Gregory P. Behrmann, et al., "Influence of Temperature on Diffractive Lens Performance", Applied Optics, vol. 32, No. 14, pp. 2483–2489, May 1993.

Carmina Londono, et al., "Athermalization of a Single–Component Lens with Diffractive Optics", Applied Optics, vol. 32, No. 13, pp. 2295–2301, May 1993.

*Primary Examiner*—Darren Schuberg
*Assistant Examiner*—John Juba, Jr.
*Attorney, Agent, or Firm*—Lyon & Lyon LLP

[57] ABSTRACT

A scanner including a plastic focusing lens and thermal compensation element, integrally formed with the asphere or comprising a separate element, to replace the existing glass laser diode focusing lens. The combined optical system is thereby configured to provide overall temperature compensation for the system with reduced cost and improved performance.

19 Claims, 3 Drawing Sheets

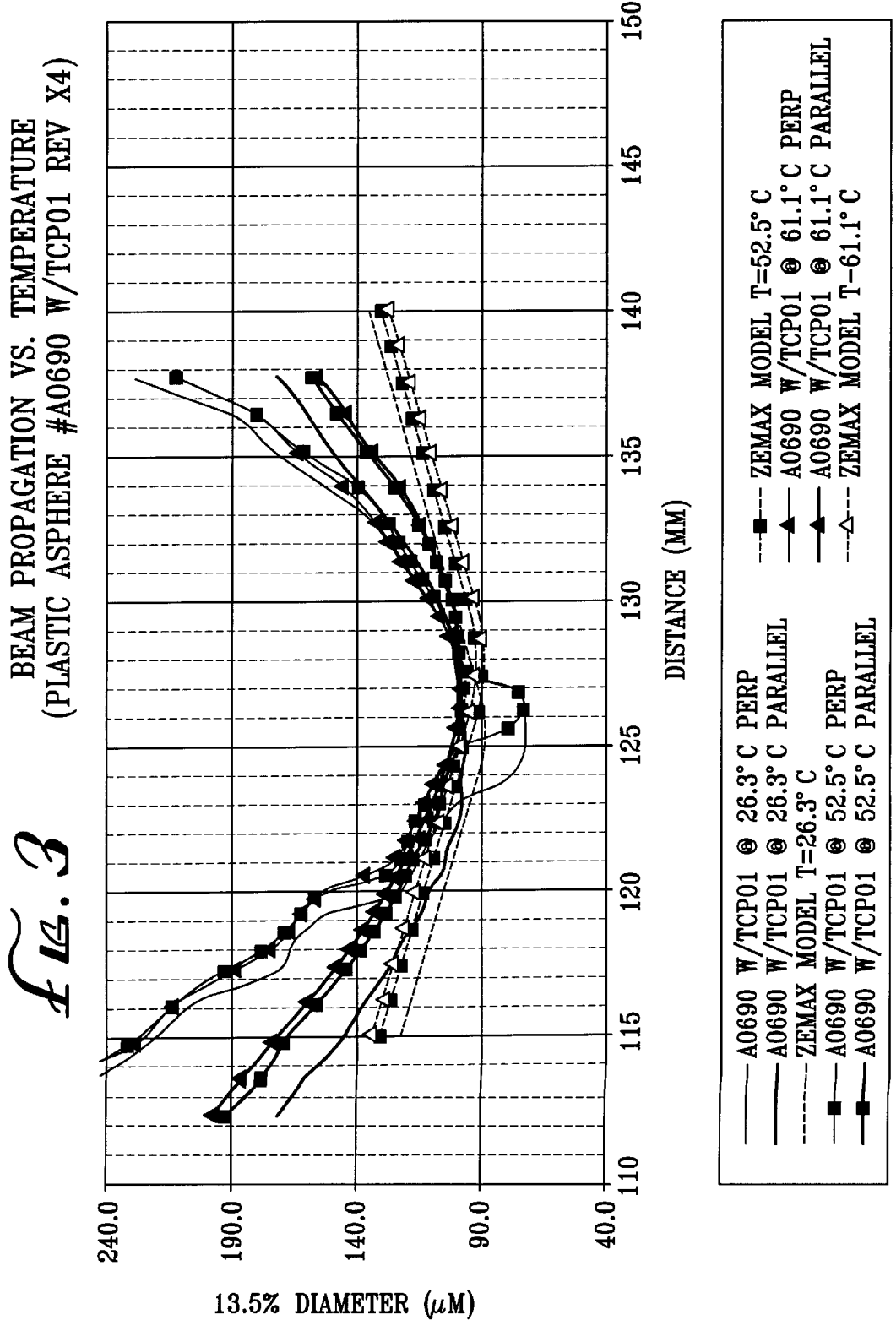

WAVELENGTH DEPENDENT THERMALLY COMPENSATED OPTICAL SYSTEM

RELATED APPLICATION DATA

This application is a continuing application of provisional application Ser. No. 60/072,683 filed Jan. 27, 1998.

BACKGROUND OF THE INVENTION

The field of the present invention relates to data reading devices such as for example bar code scanning systems. The invention is applicable to both stationary or handheld scanners.

In a detection system such as a bar code scanning device employing a focusing lens, a light source such as a laser, laser diode, or non-coherent light source (e.g. light emitting diode) emits light which passes through and is focused by the focusing lens system. The object to be scanned is passed through the focused beam and if the bar code is sufficiently close to the beam focal point, reflected light from the bar code may be detected resulting in a successful scan. The scanning device may comprise moving spot laser beams from a laser or laser diode with the beam(s) scanned in one or more various directions out through the scanner window, CCD's, other imaging devices or a non-moving beam, such as a wand, in which the wand is moved across the bar code symbol or the object itself is moved past the beam in order to sweep the code symbol. As any optical system, data reading devices such as bar code scanners depend upon focused optics for effective and accurate performance.

As known by one skilled in the art, a focal point is typically not a discrete point but may be referred to as a "waist." The waist is the position along the beam axis where the "cone" of light from the light source reaches a minimum spot size, usually as measured in a direction parallel to the direction of spot motion. When the bar code or object being scanned does not fall sufficiently close to the focal point or waist, that is when the beam spot at that position is too large, the scanner cannot successfully read a symbol. By way of example, in a supermarket checkout application, a product bearing a UPC bar code label is passed at a certain distance in front of the window of a checkout scanner. The checkout scanner is designed with a scanning beam with a waist of a given diameter positioned at a certain distance from the window where the bar code is expected to pass. The checkout clerk generally becomes familiar with the proper distance to pass the object in front of the window, that is, the bar code must pass sufficiently close to the scanner focal point or waist (i.e. within its depth of field) in order to achieve a successful scan.

Though it is known that temperature can have an effect on focal properties of the scanner, the impact has been considered relatively small such that it has been deemed unnecessary to provide for significant temperature compensation. In a typical laser diode system, the diode produces a laser beam which is focused by a glass lens. Currently the lens barrel of the laser diode in the PSC Inc. model VS-1200™ bar code scanner is designed/optimized to offset the focal shift due to the thermal expansion of the glass lens.

The present inventor has determined that temperature may have a significant impact on the focusing properties of the reader and thus the focal distance when a plastic lens is used. Depending on the application, a scanner may experience significant temperature variation and thus produce a significant impact on focusing.

SUMMARY OF THE INVENTION

The present inventor has recognized that several scanner components are affected by temperature including:

change in focusing due to expansion/contraction of lens mounting components;

change of focusing characteristics of diffractive optical elements;

change in focusing characteristics of glass or plastic lens elements;

change in wavelength of beam generated by the laser diode;

change in focusing by diffractive elements due to change in beam wavelength.

A scanner according to a preferred construction of the present invention includes a plastic focusing lens and thermal compensation element, integrally formed with the asphere or comprising a separate element, to replace the existing glass laser diode focusing lens. The combined optical system is thereby configured to provide overall temperature compensation for the system with reduced cost and improved performance.

BRIEF DESCRIPTION OF THE DRAWINGS

FIG. 3 is a graph of beam propagation versus temperature for a plastic asphere and temperature compensation element;

DESCRIPTION OF PREFERRED AND ALTERNATIVE EMBODIMENTS

Figure 1:
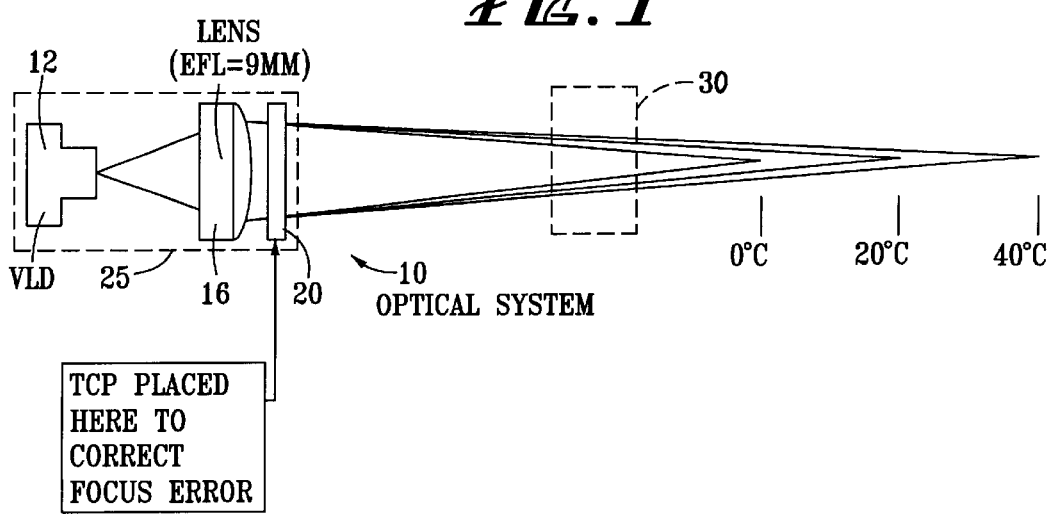
FIG. 1 is a schematic of a data reader system according to a preferred embodiment.

Preferred embodiments will now be described with reference to the figures. To facilitate description, any identifying numeral representing an element in one figure will represent the same element in any other figure.

Diffractive optics are different from conventional (refractive) optics in that they do not rely on surface curvature to change the phase of the wavefront. Geometric raytracing, as defined by Snell's Law, describes how light entering or exiting a curved surface will change direction at the surface. A diffractive surface has small regions or steps (flat or curved) which look like a microscopic fresnel lens. However, the period of these steps are on the order of the wavelength of the light so they do not obey Snell's Law (periods on fresnel lenses are hundreds of wavelengths). The steps can be designed to produce the same wavefront as the refractive surface, however the maximum step height changes the phase by only $2\pi$ radians or $\lambda/(n-1)$ in units of length. The element will redirect the light in the same way as the refractive-equivalent, but it is caused by diffraction of light exiting the steps rather than refraction. This difference means that the wavefront produced by a diffractive surface is more sensitive to wavelength than a refractive element and less sensitive to temperature.

The focal distance of lenses themselves may vary with temperature with plastic (molded) lenses generally varying to a somewhat greater degree than glass lenses. It has also been determined that laser diode beam frequency (wavelength) varies with temperature, and since the focal distance of many diffractive or refractive lenses vary with the frequency of the beam, temperature also impacts focal distance due to the wavelength shift. Focus variations due to thermal effect on plastic (i.e. molded) lenses are a problem for electro-optical systems such as bar code scanners.

A conventional refractive lens is affected by temperature changes in two ways. The physical dimensions (radius of curvature, thickness, diameter) change according to the coefficient of thermal expansion. This coefficient ($\alpha$) is about 7 to $10 \times 10^{-6}/°$ C. for glass (e.g. BK-7) and 60 to 90 $\times 10^{-6}/°$ C. for plastic (e.g. polystyrene). The focal length is proportional to the radius of curvature so it increases linearly with temperature. A plastic lens will have a focal length shift of roughly 10× that of a glass lens due to this phenomenon.

The other affect of temperature is to change the index of refraction of the optical element (e.g. lens) material. The coefficients that relate to index change are much greater for plastic than for glass. Since the deviation of the ray angle is related to the index by Snell's Law, this temperature factor also effects the lens focal length.

The equation for focal length shift of refractive elements is:

$$\Delta f = f\left(\alpha - \frac{1}{n - n_0}\left(\frac{dn}{dT} - n\frac{dn_0}{dT}\right)\right)\Delta T \qquad \text{Eq. 1}$$

where, $\alpha$=Coefficient of thermal expansion n=Index of refraction of the media $n_0$=Index of refraction of air.

Snell's Law generally does not apply to diffractive optical elements because of the small element size. A diffractive surface is defined with a polynomial which yields the phase of the wavefront as a function of location on the lens. The overall diameter will increase and decrease with temperature which will scale this polynomial.

The focal length of a diffractive element is not dependent on the index of refraction of the media. Only the index of the media where the waist occurs is relevant (i.e. air in most cases) because a diffractive element is essentially a zone plate. Since the index of air is close to 1 and changes very little over temperature, temperature effect on a diffractive element has a relatively small contribution toward focal length shift.

The equation for focal length shift of a diffractive elements is:

$$\Delta f = f\left(2\alpha + \frac{1}{n_0}\left(n\frac{dn_0}{dT}\right)\right)\Delta T \qquad \text{Eq. 2}$$

The diffractive element is twice as sensitive to thermal expansion as the refractive element. However, since there is no dn/dt dependence, and dn/dt is the major contributor to focal shift for plastic optics, the diffractive element has a lower shift overall. Table 1 below shows some results based on the Equations 1 and 2 above. These focal length shifts may not seem very large until it is noted that a typical scanner optical system has a longitudinal magnification factor of ≈20. This factor yields a waist movement of ≈46% of the image distance for a polystyrene refractive lens.

TABLE 1

| Media | dn/dt | $\alpha$ | Refr. % $\Delta$ F.L. ($\Delta T = 50°$ C.) | Diffr. % $\Delta$ F.L. ($\Delta T = 50°$ C.) |
|---|---|---|---|---|
| BK-7 | $-2.2 \times 10^{-6}$ | $7.1 \times 10^{-6}$ | 0.20% | 0.12% |
| Polystyrene | $-2.0 \times 10^{-4}$ | $90 \times 10^{-6}$ | 2.3% | 0.95% |
| Acrylic | $-1.3 \times 10^{-4}$ | $65 \times 10^{-6}$ | 1.8% | 0.70% |

The final contributor to the shift in the waist location is the thermal expansion of the optics assembly mount 25. The effect of this contributor is to change the working distance of the lens. The actual shift is dependent on the materials used and the attachment locations.

Refractive optical elements are effected by the wavelength shift through a change in the index of refraction. The focal shift due to wavelength shift is much smaller than the thermal effects (0.10% vs 2.3% over the wavelength shift that occurs between 0° C. and 50° C.).

While a diffractive optical element (DOE) has improved thermal stability, it is much more sensitive to changes in wavelength. The focal length of a DOE lens is based on the Fresnel Zone Equation:

$$r_m = \sqrt{\frac{2mf\lambda}{n} + \left[\frac{m\lambda}{n}\right]^2} \qquad \text{Eq. 3}$$

where, $r_m$ is the radius such that $\Phi(rm)=2\pi m$ $r_m$=m-th zone radius f=focal length $\lambda$=free space wavelength n=dielectric refractive index Examining this equation, as the wavelength of light increases, the focal length will decrease for constant $r_m$. Laser diodes shift in wavelength as their temperature changes. This shift is approximately linear over standard operating temperatures (−10° C. to +50° C.). A typical value for the slope of the Wavelength vs. Temperature curve for the Sony 1131VS laser diode is 0.15 nm/° C. Thus, wavelength will increase by 1.1% as the temperature increases from 0° C. to 50° C. The second term in Eq. 3 goes to zero in the first order approximation so the change in focal length is about −1.1%. An exact calculation for a 6 mm focal length lens with an F# of 2 shows a focal length shift of −1.14% as the temperature changes from 0° C. to 50° C.

The result of these two contributors to focal length shift is that a lens may be designed according to a preferred embodiment having a refractive optical surface and a diffractive optical surface. By optimizing the distribution of optical power on each surface, the shift in focal length due to thermal expansion and index change can be compensated for by the opposite shift in the focal length due to the change in laser diode wavelength.

FIG. 1 illustrates an optical system 10 comprising a laser diode 12 and a focusing lens 16. Typically the focusing lens 16 and the laser diode 12 are assembled in an optics assembly mount or barrel 25 to form a visible laser diode module (VLDM). FIG. 1 illustrates that the focal point of the system 10 may vary due to temperature, with focal distances illustrated at three different temperatures (0° C., 20° C. and 40° C.). FIG. 1 illustrates a preferred embodiment by the addition of a thermal compensation optical (TCO) comprising a thermal correction (or compensation) plate 20 (TCP) positioned in front of the focusing lens 16.

In the first embodiment of FIG. 1, the TCP 20 is a separate optical element positioned downstream of the focusing lens 16. The TCP 20 may be incorporated into the VLDM and mounted within the barrel 25, or may be mounted outside the barrel at another location within the scanner. Typically the TCP 20 will be located near the VLDM to minimize its size and therefore its cost, but conceivably the TCP could be incorporated into other elements such as for example the scanning mechanism (e.g., the scanning mirror 30) or the scanner window. The thermal compensation optics may comprise a single or multi-component TCP but preferably a single component such as a diffractive optic element (DOE) plate as described below.

To test this design, a DOE plate was designed which compensated for the thermal shift of an off-the-shelf acrylic asphere (9 mm EFL). A lens manufacturer, in the first instance Digital Optics Corporation, Charlotte, N.C. USA was provided with specifications to construct a test thermal compensation plate which would have defined optical characteristics shifting in focal length due to the change in laser diode wavelength. The manufacturer designed the TCP optics model using Code V™, an optical design software package commercially available from Optical research Associates, Pasadena, Calif. USA. This design was then verified on Zemax™ also an optical design software package commercially available from Focus Software Inc., Tucson, Ariz. USA. In order to obtain the desired thermal compensation, the DOE had some optical power which made the EFL of the entire system about 7.2 mm. The optics assembly mount was included in the model. This model predicted thermal shift of the waist location of 0.4% from 0° C. to 50° C. An equivalent acrylic lens would yield a shift of 27%. An equivalent BK-7 lens would have a shift of 1.3%.

This thermal compensation plate 20 (TCP) was then fabricated on a silica substrate and tested in the lab with the acrylic asphere 16. Both optical elements were mounted into one lens barrel 25 which was mounted into the laser diode housing and focused. The entire optics module 10 was then placed inside a small thermal chamber. The beam diameter as a function of distance was measured at room temperature, 50° C. and 60° C. All temperature measurements were taken on or very near (<5 mm) the lens barrel 25.

Figure 2:
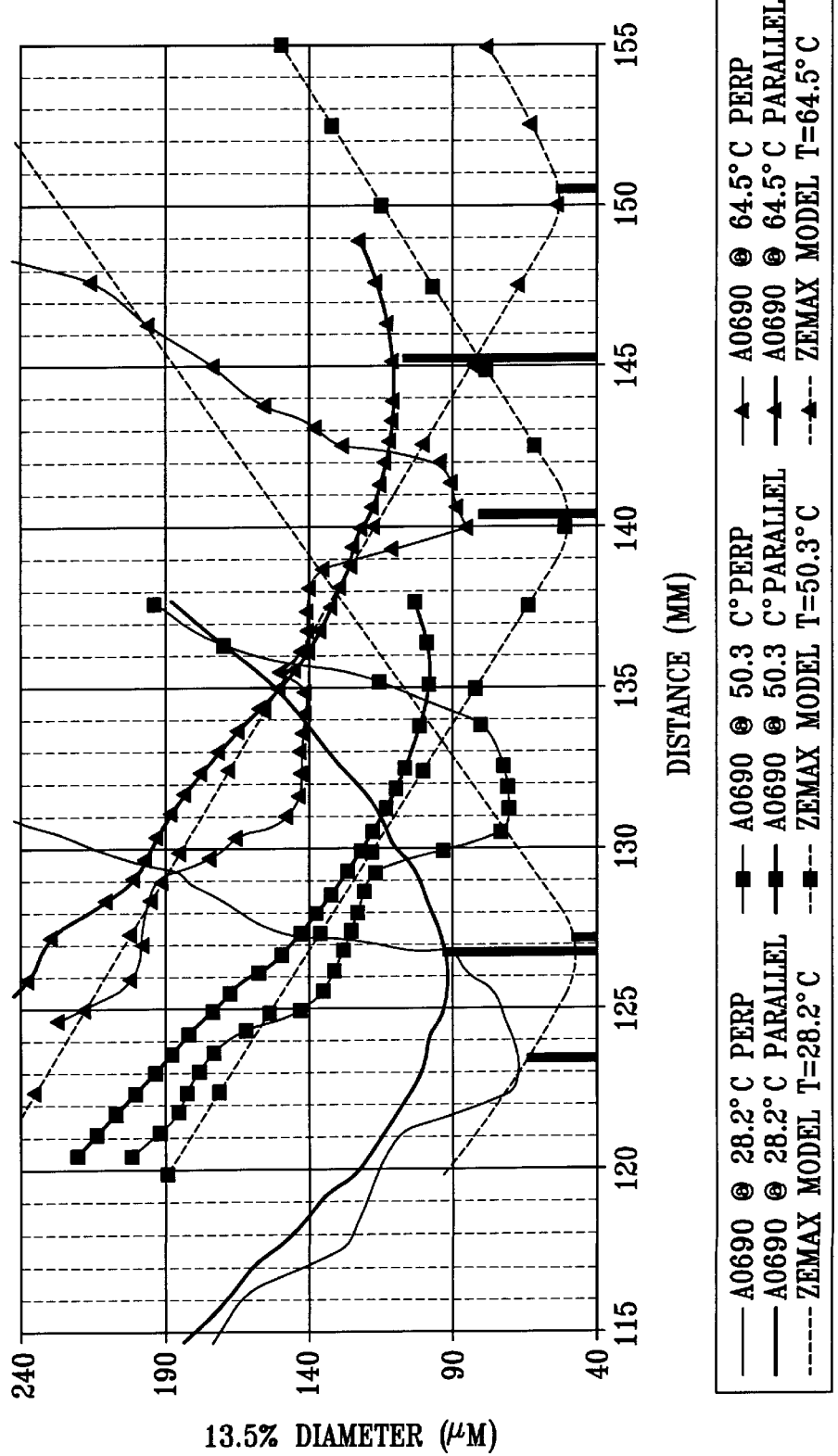
FIG. 2 is a graph of beam propagation versus temperature for a plastic asphere.

The results of this experiment are shown in FIGS. 2 and 3. FIG. 2 illustrates graphs of Beam Diameter versus Distance from the target. FIG. 2 shows the beam propagation for the perpendicular and parallel axes at 28.2° C., 50.3° C. and 64.5° C. for the case of the acrylic asphere without the TCP. The parallel waist shifts by 23 mm which correlates with the Zemax™ model. The perpendicular axis is truncated which reduces the thermal shift. Zemax™ does not model the effects of beam truncation.

FIG. 3 shows the beam propagation with the TCP in place. The shift in waist location between 26.3° C. and 61.1° C. is only 2 mm. The Zemax™ model predicted 3 mm. It is believed that the reason the compensation was not perfect was two-fold. First, the TCP was etched into a substrate with a different thickness than was used in the design. Second, the separation between the asphere and the TCP was different in the as-built case from the design. When these discrepancies were included in the Zemax™ model, the resulting 3 mm shift was predicted thus providing good correlation with the experimental results.

The short-term reduction in the perpendicular beam diameter near the waist is of some interest. This shape is common in cases where the beam is truncated. It is an indication that sidelobes are present which, when they rise above the intensity threshold, cause the beam diameter to increase sharply. In this experiment, the TCP was tilted somewhat from the system optical axis. This orientation led to a larger sidelobe. The fact that the smaller beam diameter region disappears at higher temperatures may mean that the sidelobe was higher than the 13.5% intensity threshold throughout the region at 61.1° C. The overall depth of field was not effected by this issue.

Figure 4:
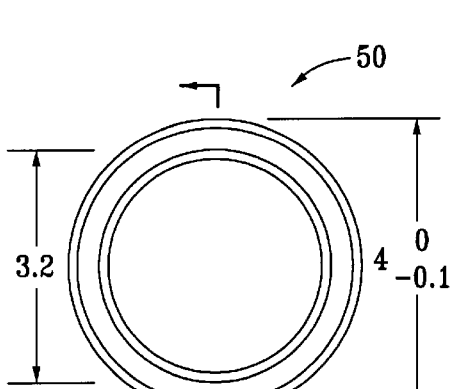
FIG. 4 is front elevation view of an integrated focusing lens and temperature compensation optical element.
Figure 5:
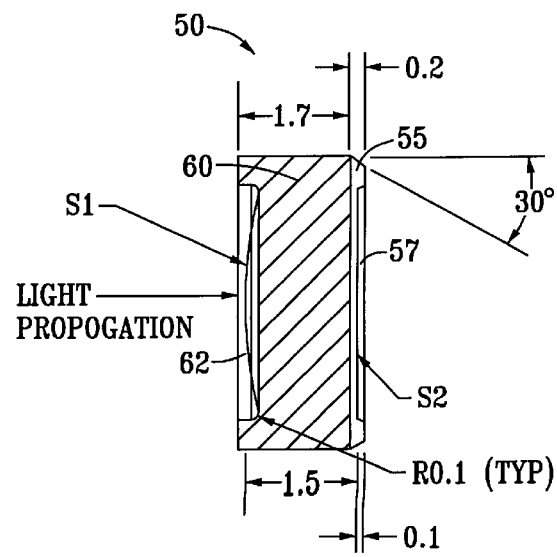
FIG. 5 is a cross sectional view of the optical element of FIG. 4.

Though the diffractive thermal compensation element may comprise a separate optical element (the TCP as in FIG. 1) a single lens element may be constructed with a plurality of integral components. FIGS. 4–5 illustrate a combination lens 50 including a thermal compensation element 55 incorporated into a plastic focusing lens element 60. All dimensional units in FIGS. 4–5 are in mm. The focusing lens element 60 includes an asphericle optical surface 62 designed to focus the laser beam at a given distance. The optical surface 62 is defined by:

$$SAG=C*R^2/(1+(1-(1+K)*C^2*R^2)^{0.5})+A_4*R^4+A_6*R^6+A_8*R^8+A_{10}*R^{10}+A_{12}*R^{12}$$

where $C=0.09703656$ $K=-165.3926$ $A_4=0.0168752$ $A_6=0.006481929$ $A_8=0.0007975708$ $A_{10}=0.0005434195$ $A_{12}=-0.0001691591$ The diffractive optical surface 57 is constructed with a phase wavefront defined by:

$$Phase=P_2*(R/R_0)^2+P_4*(R/R_0)^4$$

where $R_0=1$ $P_2=-537.8182$ $P_4=9.944713$

The effective focal length is 6 mm at a nominal wavelength of 679 nm. The lens material is Dow 685D polystyrene. Other plastic materials may be employed such as acrylic, but would require some lens redesign to accommodate the change in material.

If desired, the diffractive and refractive surfaces may be combined one optical surface. In this case, the diffractive "ridges" are superimposed on the curvature of the diffractive surface. This structure may have the advantage of simplifying fabrication since only one surface must be diamond turned. For lenses of different focal length, only one surface need be modified.

Designing and fabricating a refractive/diffractive hybrid lens 50 which is injection molded in plastic will allow lens designs with better beam quality and cheaper overall costs. It is estimated that the production piece price for the hybrid lens 50 to be between $0.50 and $1.00 (U.S. dollars) whereas current price for the typical glass lens is about $1.80.

Additional savings may potentially be realized by incorporating an aperture into the lens and/or implementing a press-fit flange on the lens. Further combinations of optical elements (integral and/or separate) may be implemented such as those described in U.S. Pat. No. 5,565,668 herein incorporated by reference.

A computer model is only as good as the input data. The above analysis has used data on the plastic materials from the manufacturer and have called out specific materials on the drawing. However, we have not verified the thermal coefficients for dn/dt experimentally. Because of the hydroscopic properties of acrylic, plastic lens made from polystyrene may be used which has a much lower focal length shift as humidity changes. The experiment described above was for an acrylic lens.

The information on the wavelength vs. temperature characteristics of the 1131VS laser diode was obtained from Sony Corporation which indicated that the slope can shift between 0.10 nm/° C. and 0.18 nm/° C. Putting these values into the Zemax™ model yields a worse case shift in waist position of 8% between 0° C. and 50° C. This shift corresponds to 10 mm for a scanner such as the PSC Inc. model QS6000 bar code scanner. The value of this slope may be measured with the ILX Laser Diode Measurement System available from ILX Lightwave, Bozeman, Mont., USA.

Injection molding of DOE's is still a new technology. There are issues with fabrication of the DOE surface pin and how to hold it in the tool. There are increased complexities in the molding process to assure good replication of the microstructures of the DOE surface. There are concerns about how these structures will wear in the tool. First article testing can address the fabrication and replication issues, but tool wear should be addressed with a more aggressive maintenance procedure and fabrication of back-up DOE pins. The fabrication process for the pins may allow extras to be made at the same time so back-ups can be available. Diffraction efficiency testing can be done on a lot to lot basis to quantify tool wear. These issues are the main reason DOE injection molding is more expensive than standard injection molded lenses. This increased cost is still much cheaper than glass lenses.

Thus a thermally compensated optical system including both refractive and diffractive optical surfaces has been show and described. Thermal shift of the waist was reduced by 93% over the acrylic asphere without compensation. This performance is competitive with the stability of the glass single lenses that are currently in use.

Though the present invention has been set forth in the form of its preferred embodiments, it is nevertheless intended that modifications to the disclosed object detection system may be made without departing from inventive concepts set forth herein.

I claim:

1. A laser scanner for reading optical symbols, comprising
   a light source generating a laser beam along an outgoing light path;
   a scanning mechanism disposed in the outgoing light path for scanning the laser beam over a scan angle to generate at least one scan line;
   at least one focusing lens positioned in the outgoing light path between the light source and the scanning mechanism for focusing the laser beam;
   a thermal compensation component positioned in the outgoing light path downstream of the at least one focusing lens, the component comprising a diffractive optic having defined thermal optical characteristics for compensating for shift in focal length of the laser beam due to thermal expansion of the at least one focusing lens.

2. A scanner according to claim 1 wherein the at least one focusing lens comprises a plastic lens element.

3. A scanner according to claim 1 further comprising an assembly mount, wherein the light source and the at least one focusing lens are mounted on the assembly mount and wherein the diffractive optic compensates for shift in focal length of the laser beam due to thermal expansion of the assembly mount.

4. A scanner according to claim 1 wherein the diffractive optic compensates for shift in focal length due to wavelength change caused by thermal impact on the light source.

5. A scanner according to claim 1 wherein the at least one focusing lens comprises a lens element having an aspheric surface.

6. A scanner according to claim 1 wherein the at least one focusing lens comprises a plastic lens and wherein the diffractive optic is integrally formed on the lens.

7. A scanner according to claim 1 wherein the at least one focusing lens comprises a plastic lens element and wherein the diffractive optic comprises a separate element disposed adjacent the plastic lens element.

8. A scanner according to claim 1 wherein the at least one focusing lens and the diffractive optic comprises a hybrid optical element having a refractive surface and a diffractive surface.

9. A scanner according to claim 1 wherein the at least one focusing lens and the diffractive optic together comprise a hybrid lens integrally formed via plastic injection molding.

10. A scanner according to claim 1 wherein the diffractive optic is constructed of molded plastic.

11. A laser bar code scanner comprising
    a light source generating a laser beam along an outgoing light path;
    a scanning mechanism disposed in the outgoing light path for scanning the laser beam over a scan angle to generate at least one scan line;
    a focusing lens positioned in the outgoing light path between the scanning mechanism and the light source for focusing the laser beam, the focusing lens comprising a hybrid optical element including a refractive portion and a diffractive portion, the diffractive portion having defined thermal optical characteristics for compensating for shift in focal length of the laser beam due to thermal expansion of the focusing lens.

12. A scanner according to claim 11 wherein the diffractive portion also compensates for shift in focal length due to wavelength change caused by thermal impact on the light source.

13. A method of scanning optical symbols, comprising the steps of
    generating a light beam and directing the light beam along an outgoing optical path;
    focusing the light beam with a focusing lens system;
    scanning the beam over a scan angle and directing the beam being scanned into a scan field to generate at least one scan line in the scan field;
    compensating for change in focal position of the light beam due to change in temperature over a given temperature range by
    determining thermal compensation factors by (1) calculating change in focusing due to thermal effect on a focusing lens system over the given temperature range, (2) determining change in wavelength of the optical beam due to thermal effect on the light source over the temperature range, (3) determining change in focusing characteristic on a diffractive optic due to the change in wavelength of the light beam;
    forming a thermal correction diffractive optic based upon the thermal compensation factors;
    locating the thermal correction diffractive optic in the outgoing optical path;
    scanning an optical symbol positioned in the scan field.

14. A method according to claim 13 wherein the focusing lens system comprises a plastic lens element.

15. A method according to claim 14 further comprising integrally forming the thermal correction diffractive optic on the lens element.

16. A method according to claim 13 wherein the step of determining thermal compensations factors further comprising determining change of focusing characteristic of the diffractive optic due to thermal expansion over the temperature range.

17. A method according to claim 13 wherein the step of determining thermal compensations factors further comprising calculating change in focusing due to thermal effect on lens mounting components over the given temperature range.

18. A method according to claim 13 further comprising forming the focusing lens system and the thermal correction optic as an integral lens element comprising a refractive optical surface and a diffractive optical surface.

19. A method according to claim 13 further comprising optimizing distribution by compensating for shift in focal length due to thermal expansion by an opposite shift in focal length due to change in light beam wavelength.

* * * * *